Nov. 10, 1931.  L. P. FORMAN  1,830,788
MANUFACTURE OF SHEET GLASS
Filed Feb. 12, 1930  2 Sheets-Sheet 2

INVENTOR
Laurence P. Forman,
by his attys,
Byrnes, Stebbins, Parmelee & Blenko

Patented Nov. 10, 1931

1,830,788

UNITED STATES PATENT OFFICE

LAURENCE P. FORMAN, OF OAKMONT, PENNSYLVANIA, ASSIGNOR TO AMERICAN WINDOW GLASS COMPANY, OF PITTSBURGH, PENNSYLVANIA, A CORPORATION OF PENNSYLVANIA

MANUFACTURE OF SHEET GLASS

Application filed February 12, 1930. Serial No. 427,790.

This invention relates to the manufacture of glass and is herein described as applied to the manufacture of sheet glass by the Fourcault process.

In the drawing of glass in sheet form it is necessary to "fix" the sheet by cooling a short distance above the line of sheet generation, and long, relatively flat coolers are generally employed for this purpose. The coolers also have an effect upon the bath and are of aid in maintaining a desired temperature condition. However, the cooling must be very carefully regulated and care must be taken that the general temperature of the drawing chamber is not unduly reduced by an excessive circulation of water through the coolers. It is desirable from the standpoint of maintaining a high speed of draw to have highly efficient coolers, but from the standpoint of maintaining the proper temperature conditions in the drawing chamber the cooling should not be too marked in effect. These conditions in a measure are opposed to one another, but I have found that the difficulty may be successfully overcome by varying the rate of heat absorption by the cooler over different portions of the surface thereof.

Preferably, that face of each cooler adjacent the rising sheet of glass is of such quality as to insure a relatively high rate of heat absorption, while the surface of the remaining portion of the cooler is such as to render the cooler relatively less efficient over such portions. The desired effect may be readily obtained by painting different portions of the cooler with paints having different colors or capable of forming surfaces having different heat absorptive qualities. As is well known, the heat absorptive quality of a body is determined in a large measure by the character of the surface, and I take advantage of this fact in my improved cooler. I preferably approximate so-called "black body"-conditions on the face of the cooler adjacent the sheet and make the remaining surface light in color and reflective in quality.

The area of the cooler which has its heat absorbing qualities enhanced by painting may be varied as desired, depending on the conditions encountered. For instance, the end portions of the cooler may be left bright so as to counteract a tendency toward too strong cooling on the sheet edges. The sheet edges are drawn from a cooler portion of the bath, and it is therefore desirable that a greater degree of cooling be effected at the center. Numerous schemes for effecting a differential rate of cooling across the bath have been proposed, but all of them are open to numerous objections. They frequently require complicated piping and if any slight change in the cooling effect is desired it frequently entails a total reconstruction. By my invention the differential cooling effect over the width of the sheet may be varied by the simple expedient of changing the heat absorbing quality of different surface portions of the cooler.

Another advantage which arises from this construction is that the cooler can be made of such size as to give the maximum cooling effect for the sheet itself, since by making the remainder of the cooler of low heat absorbing quality, little difficulty is encountered in maintaining the desired drawing temperature.

In operation I have successfully increased the speed of draw by several inches per minute with no change in operation except by the use of my improved cooler. This increase in the speed of draw materially increases the production of the machine.

In the accompanying drawings illustrating the present preferred embodiment of the invention, Figure 1 is a sectional view through a glass drawing chamber showing the coolers in place;

Figure 1:
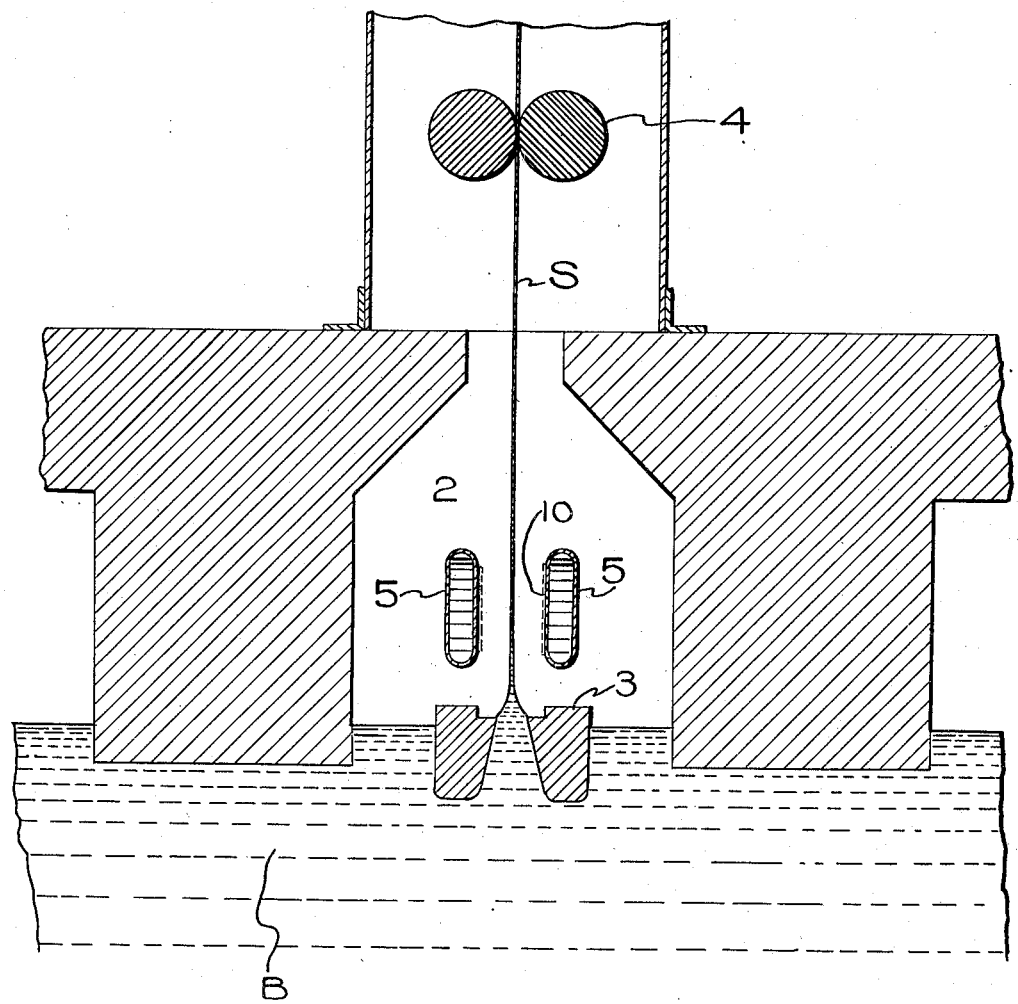

Figure 1 represents a Fourcault drawing unit comprising a drawing chamber, indicated generally by the reference character 2, having a debiteuse 3 submerged in the bath B of molten glass. The glass sheet S is drawn upwardly by means of draft rollers 4 between the coolers 5. Each cooler comprises a flat tank-like body 6 having an inlet pipe 7 with a portion 8 inside the body of the cooler effective for delivering incoming cooling water at one of the bottom corners of the body 6. The cooling water flows crosswise and passes out through an exit pipe 9. The pipes 7 and 9 extend beyond the side walls of the drawing chamber 2 and are connected to inlets and outlets in the usual manner.

I have indicated at 10 a darkened area on one side of the body 6 of the cooler. The cooler is made up of sheet metal welded together and is painted all over with aluminum paint or the like so as to make the surface generally bright and reflective in quality. The inlet and outlet pipes are similarly treated. The surface portion 10, however, is made black by applying an overlying paint coat. I have successfully employed a mixture of 50% lampblack and 50% ultramarine blue, these two pigments being thoroughly mixed and applied in a suitable vehicle such as bronzing fluid. Any good vehicle, such as is employed for bronzing or aluminum powders, may be used. The paint is applied over such portions of the cooler as may be necessary to give the desired effect. Such area or areas act substantially as black bodies and are very efficient for absorbing heat as compared with the remainder of the cooler. In practice, the black faces are placed adjacent the rising sheet so as to effect a strong chilling effect on the surface of the rising sheet without undue cooling of the drawing chamber. It will be noted that the end portions of the cooler body 6 are left unblackened, thus reducing the cooling efficiency of the end portions. These are the portions which are nearest the sheet edges where strong cooling is not so essential.

Figure 2:
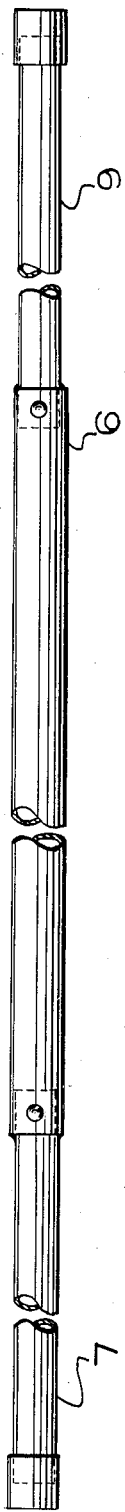
Figure 2 is a top plan view to enlarged scale of one of the coolers.
Figure 3:
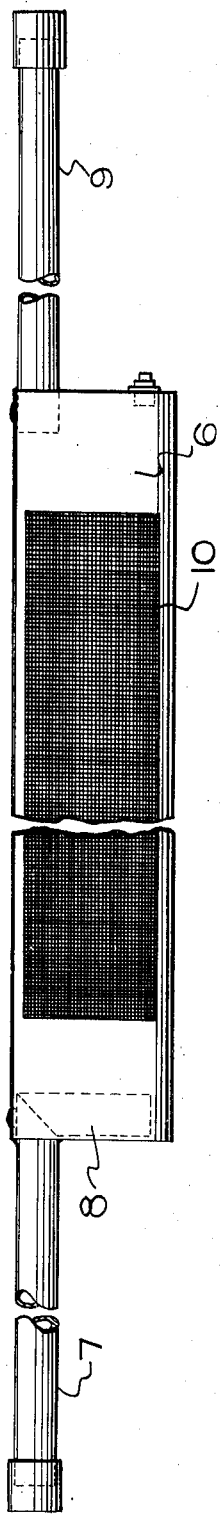
Figure 3 is a side elevation thereof.
Figure 4:
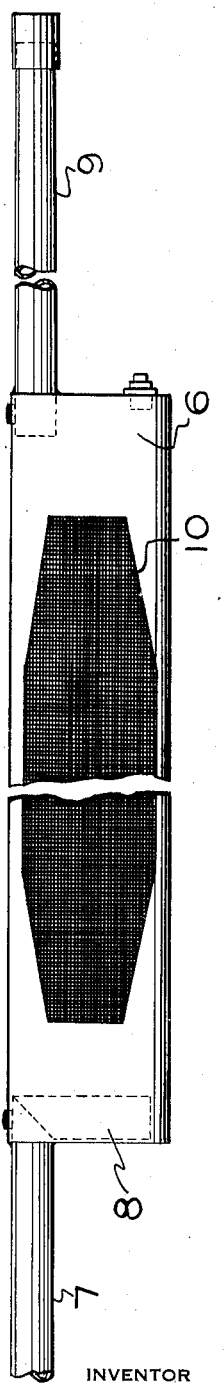
Figure 4 is a similar view but showing a slightly different arrangement.

In Figure 4 I have shown a cooler similar to that of Figures 2 and 3, but with the black paint arranged in different configuration. The width of the paint coat is reduced adjacent the end portions so as to still further reduce the cooling efficiency of such end portions.

I have illustrated and described a present preferred embodiment of the invention as applied in the Fourcault process. It will be understood, however, that the invention is not limited to the form shown but may be otherwise embodied or practiced within the scope of the following claims.

I claim:

1. In the manufacture of glass, the steps consisting in drawing the glass past a cooler and varying the rate of heat absorption by the cooler over different portions of the surface thereof by treating the different portions of the surface.

2. In the manufacture of glass, the steps consisting in drawing the glass from a bath past a cooler and varying the rate of heat absorption by the cooler over different portions of the surface thereof by treating the different portions of the surface, the rate of heat absorption from the formed sheet being greater than the rate of heat absorption from the bath.

3. A cooler for use in glass drawing comprising a body having different surface portions differently painted.

4. A cooler for use in glass drawing comprising a body having different surface portions painted with paints of different heat absorbing quality.

5. A cooler for use in glass drawing comprising a body, one part of whose surface is bright and part of whose surface approximates that of a black body.

6. A glass drawing apparatus, means for drawing a sheet of glass from a bath, and a cooler adjacent the line of travel of the sheet, the cooler having different surface portions treated in such manner as to produce surfaces of different heat absorbing quality.

7. A glass drawing apparatus, means for drawing a sheet of glass from a bath, and a cooler adjacent the line of travel of the sheet, the cooler having some surface portions bright and some surface portions dark, the dark portions approximating a black body.

8. A glass drawing apparatus, means for drawing a sheet of glass from a bath, and a cooler adjacent the line of travel of the sheet, the cooler having some surface portions bright and some surface portions dark, the dark portions being adjacent the rising sheet, and approximately a black body.

9. A glass drawing apparatus, means for drawing a sheet of glass from a bath, and a cooler adjacent the line of travel of the sheet, the cooler having different surface portions painted with paints of different heat absorbing qualities.

10. In the manufacture of glass, the step of drawing a glass sheet past a cooler having different portions coated with paints of different heat absorptive quality.

11. In the manufacture of glass, the step of drawing a glass sheet past a cooler having different portions thereof coated with paints of different heat absorptive quality, the central portions of the cooler having a greater area coated by paint of high heat absorbing quality than the end portions.

12. In the manufacture of glass, the step of drawing a sheet of glass past a cooler having different parts of the surface thereof treated in such manner as to produce surfaces of different heat absorbing quality.

13. A cooler for use in glass drawing comprising a body having different surface portions treated differently to produce surfaces of different heat absorbing quality.

In testimony whereof I have hereunto set my hand.

LAURENCE P. FORMAN.